US008988551B2

(12) United States Patent
Moon et al.

(10) Patent No.: US 8,988,551 B2
(45) Date of Patent: Mar. 24, 2015

(54) APPARATUS AND METHOD FOR DETECTING FLICKER IN CAMERA MODULE

(71) Applicant: Samsung Electronics Co. Ltd., Suwon-si, Gyeonggi-do (KR)

(72) Inventors: Sung-Hwan Moon, Suwon-si (KR); Yong-Gu Lee, Seoul (KR); Min-Kyu Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 13/873,853

(22) Filed: Apr. 30, 2013

(65) Prior Publication Data

US 2013/0293742 A1 Nov. 7, 2013

(30) Foreign Application Priority Data

May 2, 2012 (KR) ......................... 10-2012-0046493

(51) Int. Cl.
*H04N 9/73* (2006.01)
*H04N 5/235* (2006.01)
*G06T 7/20* (2006.01)

(52) U.S. Cl.
CPC ............ *H04N 5/2357* (2013.01); *G06T 7/2053* (2013.01); *G06T 2207/20056* (2013.01)
USPC .................. 348/226.1; 348/227.1; 348/228.1

(58) Field of Classification Search
None
See application file for complete search history.

(56) References Cited

U.S. PATENT DOCUMENTS

| 7,248,289 | B2* | 7/2007 | Katoh et al. ............... 348/228.1 |
| 2002/0154225 | A1* | 10/2002 | Matsumoto et al. ........ 348/229.1 |
| 2009/0128693 | A1* | 5/2009 | Owaki et al. .................. 348/441 |
| 2009/0175496 | A1* | 7/2009 | Kondo et al. .................. 382/103 |
| 2011/0205394 | A1* | 8/2011 | Fuchigami ................. 348/226.1 |
| 2012/0081570 | A1* | 4/2012 | Hsieh .......................... 348/226.1 |
| 2012/0120286 | A1* | 5/2012 | Egawa .......................... 348/246 |
| 2012/0320232 | A1* | 12/2012 | Trumbo ..................... 348/226.1 |

* cited by examiner

*Primary Examiner* — Lin Ye
*Assistant Examiner* — John H Morehead, III
(74) *Attorney, Agent, or Firm* — Jefferson IP Law, LLP

(57) ABSTRACT

An apparatus and method for detecting flicker in a camera module is provided. The method including generating a first image frame and a second image frame, setting up a first sampling area in the first image frame and a second sampling area in the second image frame, sampling a plurality of horizontal lines from among all of the horizontal lines contained in each of the first sampling area and the second sampling area, accumulating brightness values of pixels located on each of the sampled horizontal lines to generate first accumulated brightness values for the first image frame and second accumulated brightness values for the second image frame, and detecting flicker based on the first accumulated values and the second accumulated values, wherein the first sampling area and the second sampling area have the same sizes and the same horizontal starting points but have different vertical starting points.

13 Claims, 4 Drawing Sheets

APPARATUS AND METHOD FOR DETECTING FLICKER IN CAMERA MODULE

PRIORITY

This application claims the benefit under 35 U.S.C. §119 (a) of a Korean patent application filed in the Korean Intellectual Property Office on May 2, 2012 and assigned Serial No. 10-2012-0046493, the entire disclosure of which is hereby incorporated by reference.

BACKGROUND OF THE INVENTION

1. Field of the Invention

The present invention relates to camera modules. More particularly, the present invention relates to an apparatus and a method for detecting flicker in a camera module.

2. Description of the Related Art

With the progression of technology, modern cameras provide a high level of user satisfaction of photographed images. However, there are some factors that decrease the user satisfaction. One factor is the occurrence of a flicker in the image. The flicker refers to a phenomenon in which horizontal lines, such as green lines, appear in an image.

In order to detect the flicker, camera modules have used a method of performing a difference operation on consecutive image frames to produce components related to the flicker, and using the produced components related to the flicker to remove the flicker.

However, the method has difficulty producing the components related to the flicker when a vertical phase difference in the flicker between consecutive image frames is less than a certain criterion. In that case, the flicker may not be detected despite an occurrence of the flicker in the image frames. Therefore, it is necessary to provide an apparatus and method to address these and similar problems.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for detecting flicker even when a vertical phase difference in the flicker between frames is less than a certain criterion.

In accordance with an aspect of the present invention, an apparatus for detecting flicker in a camera module is provided. The apparatus includes a camera unit for generating a first image frame and a second image frame, and a controller for setting up a first sampling area in the first image frame and a second sampling area in the second image frame, for sampling a plurality of horizontal lines from among all of the horizontal lines contained in each of the first sampling area and the second sampling area, for accumulating brightness values of pixels located on each of the sampled horizontal lines to generate first accumulated brightness values for the first image frame and second accumulated brightness values for the second image frames, and for detecting flicker based on the first accumulated value and second accumulated value, wherein the first sampling area and the second sampling area have same sizes and same horizontal starting points but have different vertical starting points.

In an exemplary implementation, the controller may sample the plurality of horizontal lines in the first sampling area, and sample the plurality of horizontal lines in the second sampling area that exist on the same positions as the sampled plurality of horizontal lines in the first sampling area.

In an exemplary implementation, the apparatus may further include a memory for storing a plurality of light-source frequencies and a plurality of flicker counts that correspond to the plurality of light-source frequencies, wherein the controller may determine values of differences between the first accumulated brightness values and the second accumulated brightness values, perform Fast Fourier Transformation (FFT) on the values of differences to produce FFT results, determine whether a maximum FFT result of the FFT results corresponds to any of the flicker counts, and, when the maximum FFT result corresponds to any of the flicker counts, determines that the flicker has occurred.

In an exemplary implementation, the controller may identify the flicker count that corresponds to the maximum FFT result, from among the flicker counts, identify a light-source frequency that corresponds to the flicker count from among the light-source frequencies, and synchronize integration time to the light-source frequency.

In an exemplary implementation, the controller may determine that the flicker has not occurred when the maximum FFT result does not correspond to any of the flicker counts.

In accordance with another aspect of the present invention, a method for detecting flicker in a camera module is provided. The method includes generating a first image frame and a second image frame, setting up a first sampling area in the first image frame and a second sampling area in the second image frame, sampling a plurality of horizontal lines from among all of the horizontal lines contained in each of the first sampling area and the second sampling area, accumulating brightness values of pixels located on each of the sampled horizontal lines to generate first accumulated brightness values for the first image frame and second accumulated brightness values for the second image frames, and detecting flicker based on the first accumulated value and the second accumulated value, wherein the first sampling area and the second sampling area have same sizes and same horizontal starting points but have different vertical starting points.

In an exemplary implementation, the sampling of the plurality of horizontal lines may include sampling the plurality of horizontal lines in the first sampling area, and sampling the plurality of horizontal lines in the second sampling area that exist on the same positions as the sampled plurality of horizontal lines in the first sampling area.

In an exemplary implementation, the detecting of the flicker may include determining values of differences between the first accumulated brightness values and the second accumulated brightness values, performing FFT on the values of differences to produce FFT results, determining whether a maximum FFT result of the FFT results corresponds to any of pre-stored flicker counts, and determining that the flicker has occurred, if the maximum FFT result corresponds to any of the flicker counts.

In an exemplary implementation, the method may further include identifying the flicker count that corresponds to the maximum FFT result from among the flicker counts, identifying a light-source frequency that corresponds to the flicker count, from among pre-stored light-source frequencies, and synchronizing integration time to the light-source frequency.

In an exemplary implementation, the method may further include determining that the flicker has not occurred, when the maximum FFT result does not correspond to any of the flicker counts.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A camera module, according to exemplary embodiments of the present invention, may be included in a portable terminal. The portable terminal is a mobile electronic device that is easily carried by a user, and may include video phones, cellular phones, smart phones, International Mobile Telecommunication-2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., laptops, tablet PCs, etc.), digital cameras, and the like.

Figure 1:
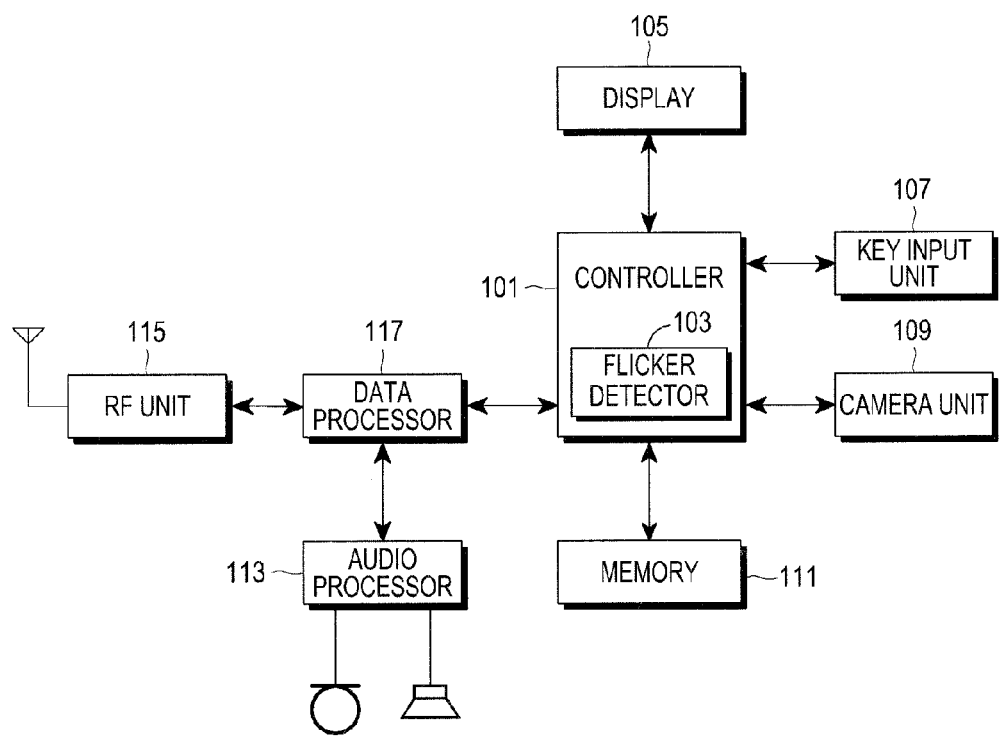
FIG. 1 is a block diagram of a portable terminal according to an exemplary embodiment of the present invention.

FIG. 1 is a block diagram of a portable terminal according to an exemplary embodiment of the present invention.

Referring to FIG. 1, the portable terminal includes a controller 101, a display 105, a key input unit 107, a camera unit 109, a memory 111, an audio processor 113, a Radio Frequency (RF) unit 115, and a data processor 117.

The RF unit 115 performs radio communication functionality of the portable terminal. In an exemplary implementation, the RF unit 115 includes a radio transmitter for performing up-conversion on a frequency of a signal to be transmitted and amplifying the up-converted signal, and a radio receiver for performing low-noise amplification on a received signal and for performing down-conversion on a frequency of the received signal. The data processor 117 includes a transmitter for encoding and modulating the signal to be transmitted, and a receiver for demodulating and decoding the received signal. The data processor 117 may include a modem and a CODEC, and the CODEC may have a data CODEC for e.g., packet data processing, or an audio CODEC for e.g., audio signal processing.

The audio processor 113 plays an audio signal output from the data processor 117, using a speaker, and/or transfers an audio signal generated by a microphone to the data processor 117, for transmission. The key input unit 107 has keys for entering information of numbers and characters, and function keys for setting various functionalities. The display 105 displays image signals onto a screen and displays data requested by the controller 101 to be output. In exemplary implementations, the display 105 may have a capacitive touch screen or a resistive touch screen. In that case, the key input unit 107 may only include a minimum number of preset keys while the display 105 may provide some key input functionalities otherwise performed by the key input unit 107.

The camera unit 109 photographs images of an object to generate image frames of the object, and outputs the generated image frames to the controller 101. In an exemplary implementation, the camera unit 109 outputs consecutive first and second image frames to the controller 101. The memory 111 includes a program memory and a data memory. The program memory stores a booting system and an Operating System (OS) for controlling general operations of the portable terminal, and the data memory stores various data that is used and/or generated during operation of the portable terminal.

In an exemplary implementation, the memory 111 stores frequencies of a plurality of light sources (hereinafter, referred to as 'light-source frequencies') and flicker counts (or the numbers of flickers) that correspond to the light-source frequencies. The light sources refer to light emitting objects or tools. For example, the light sources may be a plurality of fluorescent lamps. The flicker count indicates the number of detectable flickers in an image, the flicker being a phenomenon in which one or more horizontal lines occur in the image. For example, the horizontal lines may be green.

The memory 111 may store the flicker counts for the light-source frequencies, as shown in Table 1, in the case that the light sources are the plurality of fluorescent lamps.

TABLE 1

| Light-source frequency | Flicker count |
|---|---|
| 50 Hz | a |
| 60 Hz | b |

In Table 1, 'a' represents a flicker count for a light-source frequency of 50 Hz, and 'b' represents a flicker count for a light-source frequency of 60 Hz. The flicker count is determined by dividing integration time by a period of the flicker.

For instance, in the case that the period of the flicker for the light-source frequency of 50 Hz is 10 ms and the integration time is 27.5 ms, 'a' may be 2.75. For another instance, in the case that the period of the flicker for the light-source frequency of 60 Hz is 8.333 ms and the integration time is 27.5 ms, 'b' may be 3.3. The integration time indicates a period of time during which an image frame is illuminated.

The controller 101 controls operations of the portable terminal. In an exemplary implementation, the controller 101 receives the first and second image frames from the camera unit 109, sets up different sampling areas for the first and second image frames, respectively, samples a predetermined number of lines from among horizontal lines contained in each of the set-up sampling areas, accumulates, along the horizontal direction, brightness values of pixels located on each of the sampled horizontal lines, and detects the flicker by using the accumulated brightness values of the pixels. In an exemplary implementation, the brightness values of the pixels may be a brightness value for green.

In an exemplary embodiment, the controller 101 includes a flicker detector 103.

Figure 2:
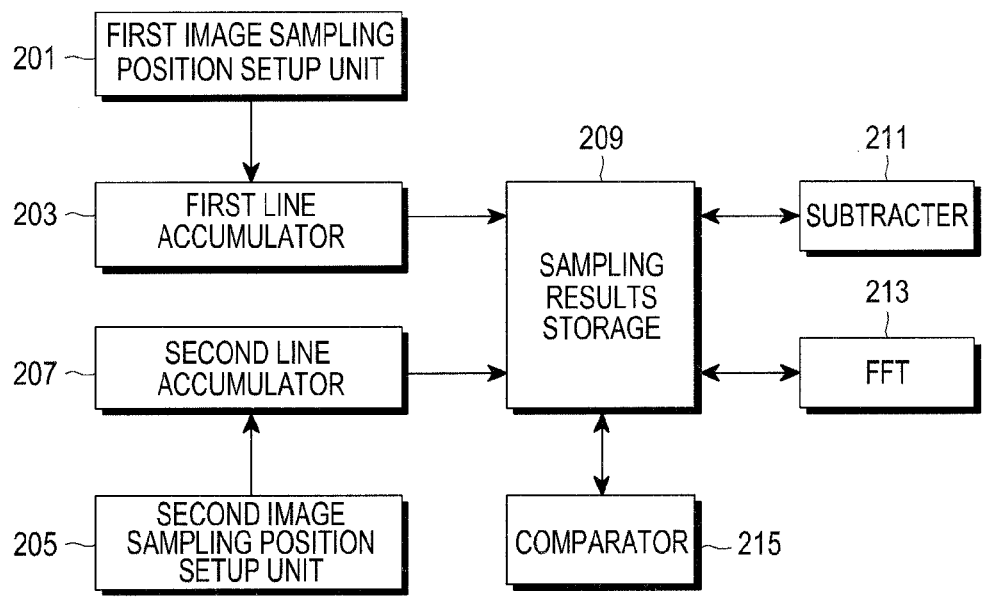
FIG. 2 is a block diagram of a flicker detector according to an exemplary embodiment of the present invention.

FIG. 2 is a block diagram of a flicker detector according to an exemplary embodiment of the present invention.

Referring to FIG. 2, the flicker detector includes a first image sampling position setup unit 201, a first line accumulator 203, a second image sampling position setup unit 205, a second line accumulator 207, a sampling results storage 209, a subtracter 211, a Fast Fourier Transform (FFT) unit 213, and a comparator 215.

The first image sampling position setup unit 201 receives the first image frame from a camera unit and sets up the first sampling area in the first image frame. The second image sampling position setup unit 205 receives the second image frame from the camera unit and sets up the second sampling area in the second image frame. In this case, the first and second sampling areas have the same length and width. However, the first and second image sampling position setup units 201 and 205 may set up vertical starting points of the first and second sampling areas to be different while setting up horizontal starting points of the first and second sampling areas to be the same.

The reason for setting up the length and width of the first and second sampling areas to be the same is that a period of the flicker is detected when a difference operation of the brightness values of pixels between the same sampling areas of the first and second image frames is performed. Further, the reason for setting up the horizontal starting points of the first and second sampling areas to be the same is that a horizontal phase difference between lines contained in the first and second sampling areas, respectively, should be removed to detect the flicker that occurs as horizontal lines in the image frame by using the difference of vertical phase changes between the first and second sampling areas. On the other hand, the reason for setting up different vertical starting points in the first and second sampling areas is that an instance where it is difficult to detect the period of the flicker due to an insignificant difference of the vertical phase changes between the first and second sampling areas should be avoided.

Accordingly, by setting up sizes and horizontal starting points of the first and second sampling areas to be the same while setting up vertical starting points to be different, values obtained by performing the difference operation of the brightness values between the lines contained in the first and second sampling areas, and performing FFT transformation on the results of the difference operation may include period and frequency information of the flicker.

Figure 4:
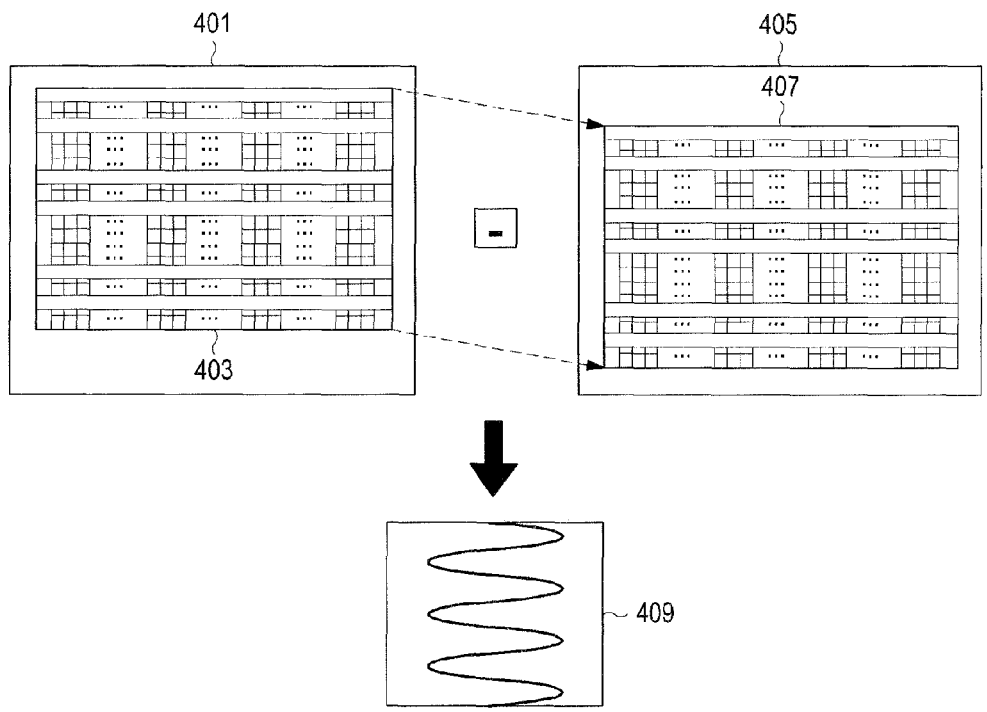
FIG. 4 illustrates screens having two images from which a flicker is detected according to an exemplary embodiment of the present invention.

FIG. 4 illustrates screens having two images from which flicker is detected according to an exemplary embodiment of the present invention.

Referring to FIG. 4, reference numeral 401 indicates a first image frame, reference numeral 403 indicates a first sampling area, reference numeral 405 indicates a second image frame, and reference numeral 407 indicates a second sampling area. The first image sampling position setup unit 201 sets up the first sampling area 403 in the first image frame, and the second image sampling position setup unit 205 sets up the second sampling area 407 to have the same size and horizontal starting point as those of the first sampling area 403 and to have a different vertical starting point from that of the first sampling area 403.

The first line accumulator 203 samples a plurality of lines from among the horizontal lines contained in the first sampling area in a predetermined method, accumulates, along the horizontal direction, brightness values of pixels located on the sampled horizontal lines to generate accumulated brightness values for sampled lines, and outputs first accumulated brightness values for the sampled lines of the first image frame to the sampling results storage 209. The second line accumulator 207 samples a plurality of lines from among the horizontal lines contained in the second sampling area in a predetermined method, accumulates brightness values of pixels located on the sampled horizontal lines to generate accumulated brightness values for sampled lines, and outputs second accumulated brightness values for the sampled lines of the second image frame to the sampling results storage 209. The predetermined method may also include a uniformity method for uniform sampling.

The first and second line accumulators 203 and 207 may sample as many lines contained in the first and second sampling areas as the number of input terminals of the FFT unit 213, respectively. For example, in a case in which the number of input terminals of the FFT unit 213 is 32, the first and second line accumulators 203 and 207 may sample 32 lines from among all the lines involved in sampling.

The first and second line accumulators 203 and 207 also sample a plurality of lines that exist on same positions from among the lines contained in the first and second sampling areas. For example, if 320 lines are contained in the first or second sampling area and the FFT unit 213 has 32 input terminals, the first line accumulator 203 samples 1st, 11th, 21st, 31st, . . . , and 311th lines and the second line accumulator 207 also samples the 1st, 11th, 21st, 31st, . . . , and 311th lines.

For another example, if the first or second sampling areas each has 100 lines and the FFT unit 213 has 32 input terminals, the first line accumulator 203 may sample 3rd, 4th, 6th, 7th, 9th, 10th, . . . , 100th lines. The second line accumulator 207 may also sample lines in the same manner as the first line accumulator 203.

The first and second line accumulators 203 and 207 each determine the accumulated brightness values by accumulating each of the brightness values of pixels included on the sampled lines.

For example, if the first and second line accumulators 203 and 207 each sample 1st, 11th, 21st, 31st, ..., and 311th lines, the first line accumulator 203 may determine a final accumulated brightness value for each of the 1st, 11th, 21st, 31st, ..., and 311th lines by accumulating the brightness values of pixels included in each of the 1st, 11th, 21st, 31st, ..., and 311th lines. The second line accumulator 207 may also determine a final accumulated brightness value for each of the 1st, 11th, 21st, 31st, ..., and 311th lines by accumulating the brightness values of pixels included in each of the 1st, 11th, 21st, 31st, ..., and 311th lines.

For another example, if the first and second line accumulators 203 and 207 each sample 3rd, 4th, 6th, 7th, 9th, 10th, ..., 100th lines, the first and second line accumulators 203 and 207 may each determine an accumulated brightness value for each of the 3rd, 4th, 6th, 7th, 9th, 10th, ..., 100th lines by accumulating the brightness values of pixels included in each of the 3rd, 4th, 6th, 7th, 9th, 10th, ..., 100th lines. In a case where the number of bits for the accumulated brightness value is equal to or greater than a predetermined value, the first and second line accumulators 203 and 207 each reduce the number of bits for the accumulated brightness value by dividing the accumulated brightness value by a predetermined value, multiplying the accumulated brightness value by a number after the decimal point, performing shift operations on the accumulated brightness value, and the like.

For example, if the accumulated brightness value amounts to 23 bits, the first and second line accumulators 203 and 207 may each reduce the number of bits of the accumulated brightness value by performing a shift operation to remove 8 insignificant bits of the 23 bits of the accumulated brightness value.

The sampling results storage 209 stores the first and second accumulated brightness values received from the first and second line accumulators 203 and 207, respectively, and outputs the first and second accumulated brightness values to the subtracter 211. The subtracter 211 in turn determines differences between the first and second accumulated brightness values to determine differences between lines that exist at the same positions in the first and second sampling areas, and outputs the differences of the accumulated brightness values to the FFT unit 213. For example, if the number of sampled lines is 32, the subtracter 211 may determine a difference between a first accumulated brightness value from among the first accumulated brightness values and a first accumulated brightness value from among the second accumulated brightness values, and repeat this determination to obtain differences between two consecutive accumulated brightness values from the first to 32nd accumulated brightness values.

The FFT unit 213 receives values of the differences between accumulated brightness values, performs FFT transformation on the values of the differences to obtain FFT results, and outputs the obtained FFT results to the comparator 215. The comparator 215 receives the FFT results from the FFT unit 213, compares the FFT results with any of flicker frequencies for the plurality of light-source frequencies stored in the memory 111, and determines whether a maximum FFT result of the FFT results corresponds to a flicker count that corresponds to a particular light-source frequency. The maximum FFT result refers to an FFT result having the greatest value from among the FFT results.

Figure 5:
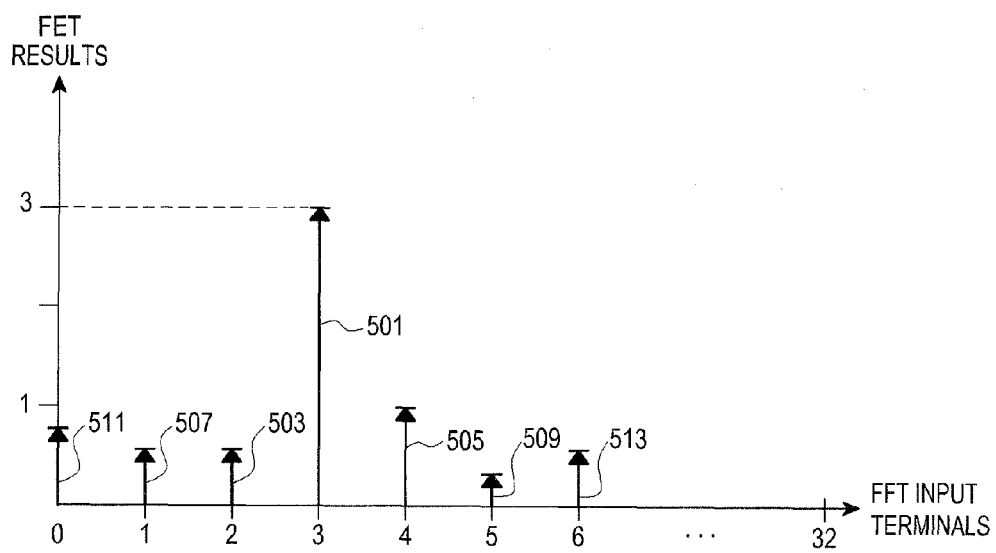
FIG. 5 shows a graph representing values of Fast Fourier Transform (FFT) results that correspond to sampling lines according to an exemplary embodiment of the present invention.

FIG. 5 shows a graph representing values of FFT results that correspond to sampling lines according to an exemplary embodiment of the present invention.

Referring to FIG. 5, if the flicker counts for 60 Hz and 50 Hz are 3.1 and 2.35, respectively, and FFT results are 0.8 indicated by reference numeral 511, 0.6 indicated by reference numeral 507, 0.6 indicated by reference numeral 503, 3 indicated by reference numeral 501, 1 indicated by reference numeral 505, 0.4 indicated by reference numeral 509, and 0.6 indicated by reference numeral 513, the comparator 215 determines whether the maximum FFT result among the FFT results corresponds to any of the flicker counts for 60 Hz and 50 Hz by comparing each of the FFT results with the flicker count for 60 Hz and the flicker count for 50 Hz. If the flicker count is a real number, the comparator 215 may compare the flicker count rounded off to an integer with the maximum FFT result. Since the comparison shows that the forth FFT result 501 is the greatest (i.e., 3) and corresponds to the flicker count for 60 Hz, the comparator 215 may determine that the flicker has occurred.

When determining that the flicker has occurred, the comparator 215 synchronizes the integration time with the light-source frequency. In this case, the comparator 215 identifies the flicker count, which is determined to be the same as the maximum FFT result, from among the flicker counts stored in the memory 111, identifies a light-source frequency that corresponds to the identified flicker count, from among the light-source frequencies stored in the memory 111, and synchronizes the integration time to the light-source frequency.

Additionally, in a case that the maximum FFT result corresponds to the flicker count that corresponds to a particular light-source frequency, the comparator 215 determines whether a difference between the maximum FFT result and neighboring FFT results is equal to or greater than a predetermined criterion. The predetermined criterion may be determined to be within the range of 50% to 90% of the maximum FFT result. If the difference between the maximum FFT result and the neighboring FFT results is equal to or greater than the predetermined criterion, the comparator 215 determines that a flicker has occurred in the first and second image frames. Otherwise, the comparator 215 determines that flicker has not occurred.

Referring again to FIG. 5, since the forth FFT result 501 and the flicker count for 60 Hz correspond to each other, the comparator 215 determines a first difference, which is 2.4, between the fourth FFT result 501 and the third FFT result 503 and the second difference, which is 2.0, between the fourth FFT result 501 and the fifth FFT result 505. Since values of the first and second differences are equal to or greater than the predetermined criterion (e.g., assuming that the predetermined criterion is 1.8, 60% of the third FFT result), the comparator 215 determines that the flicker has occurred.

Although in the above example the comparator 215 determines whether or not the flicker has occurred by taking the differences between the maximum FFT result and the two neighboring FFT results into account, the comparator 215 may also determine whether or not the flicker has occurred by considering differences between the maximum FFT result and four neighboring FFT results.

Figure 3:
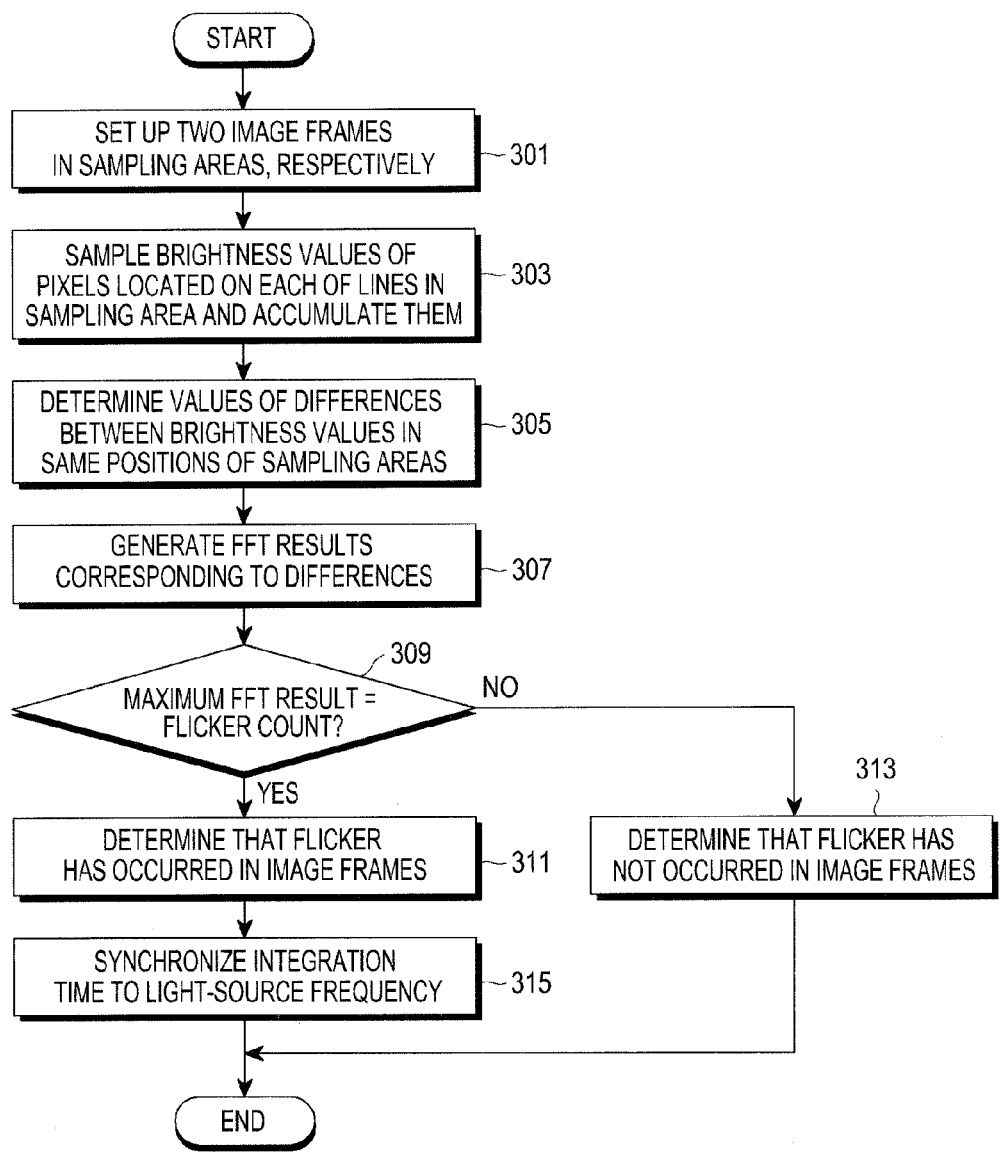
FIG. 3 is a flowchart for detecting flicker in a portable terminal according to an exemplary embodiment of the present invention.

FIG. 3 is a flowchart for detecting flicker in a portable terminal, according to an exemplary embodiment of the present invention.

Referring to FIG. 3, in step 301, the controller 101 receives the first and second image frames from the camera unit 109, sets up the first and second sampling areas in the first and second image frames, respectively, and proceeds to step 303. The first and second sampling areas have the same length and width. However, the controller 101 sets up vertical starting points of the first and second sampling areas to be different while setting up horizontal starting points of the first and second sampling areas to be the same.

In step 303, the controller 101 samples a plurality of lines in the first or second sampling area, accumulates brightness values of pixels located on the sampled lines, and proceeds to step 305.

More specifically, the controller 101 samples the plurality of lines from among horizontal lines contained in the first sampling area, according to a predetermined method, and accumulates, along the horizontal direction, brightness values of pixels located on the sampled horizontal lines to produce accumulated brightness values for the sampled lines. Furthermore, the controller 101 samples the plurality of lines from among horizontal lines contained in the second sampling area, according to a predetermined method, and accumulates, along the horizontal direction, brightness values of pixels located on the sampled horizontal lines to produce accumulated brightness values for the sampled lines. The predetermined method includes a uniformity method for uniform sampling.

In this case, the controller 101 may sample as many lines contained in the first or second sampling area as the number of input terminals of the FFT unit 213. For example, if the number of input terminals of the FFT unit 213 is 32, the controller 101 may sample 32 lines from among all the lines involved in sampling.

The controller 101 also samples a plurality of lines that exist on the same positions from among the lines contained in the first and second sampling areas. For example, if 320 lines are contained in the first or second sampling area and the FFT unit 213 has 32 input terminals, the controller 101 samples 1st, 11th, 21st, 31st, . . . , and 311th lines in the first sampling area and samples the 1st, 11th, 21st, 31st, . . . , and 311th lines in the second sampling area.

In step 305, the controller 101 determines differences between the accumulated brightness values in the same positions in the first and second sampling areas, and proceeds to step 307. For example, if the number of sampled lines is 32, the controller 101 may determine a difference between a first accumulated brightness value from among the first accumulated brightness values and a first accumulated brightness value from among the second accumulated brightness values, and repeat this determination to obtain differences between two consecutive accumulated brightness values from the first to 32nd accumulated brightness values.

In step 307, the controller 101 performs FFT transformation on the differences between the accumulated brightness values to produce FFT results for the differences, and proceeds to step 309. In step 309, the controller 101 receives the FFT results from the FFT unit 213, and compares any of flicker frequencies for the plurality of light-source frequencies stored in the memory 111 with the FFT results. From the comparison, the controller 101 determines whether the maximum FFT result of the FFT results is equal to the flicker count that corresponds to a particular light-source frequency.

If the maximum FFT result is equal to the flicker count, the controller 101 proceeds to step 311, and, otherwise, proceeds to step 313.

In step 311, the controller 101 determines that the flicker has occurred in the first and second image frames, and proceeds to step 315. In step 315, the controller 101 synchronizes the integration time to the particular light-source frequency. In this case, the controller 101 identifies the flicker count which is determined to be the same as the maximum FFT result, from among the flicker counts stored in the memory 111, identifies a light-source frequency that corresponds to the determined flicker count, from among light-source frequencies stored in the memory 111, and synchronizes the integration time to the light-source frequency.

In step 313, the controller 101 determines that the flicker has not occurred in the first and second image frames.

Referring again to FIG. 4, reference numeral 409 indicates a flicker frequency detected from the first and second image frames 401 and 405.

The controller 101 sets up the first and second sampling areas 403 and 407 in the first and second image frames 401 and 405, respectively. In this case, the controller 101 sets up the second sampling area 407 in the second image frame 405 to have the same size and horizontal starting point as those of the first sampling area 403 while having the different vertical starting point from that of the first sampling area 403. The controller 101 also samples a predetermined number of horizontal lines contained in each of the first and second sampling areas, accumulates, along the horizontal direction, brightness values of pixels located on the sampled horizontal lines, and uses differences between the accumulated brightness values of pixels to detect the frequency 409 of the flicker.

As such, the exemplary apparatus and method provided by the present invention may establish different sampling areas in consecutive image frames and use accumulated brightness values of pixels on a plurality of horizontal lines contained in the established sampling areas to detect the flicker, making it possible to detect the flicker even when the vertical phase difference in the flicker between frames is less than a given criterion.

While the present invention has been shown and described with reference to exemplary embodiments thereof, it will be understood by those skilled in the art that various changes in form and details may be made therein without departing from the spirit and scope of the present invention as defined by the following claims and their equivalents.

What is claimed is:

1. An apparatus for detecting flicker in a camera module, the apparatus comprising:
a camera unit configured to generate a first image frame and a second image frame; and
a controller configured to set up a first sampling area in the first image frame, the first sampling area being a partial area of the entire first image frame, to set up a second sampling area in the second image frame, the second sampling area being a partial area of the entire second image frame, to sample a plurality of horizontal lines from among all horizontal lines contained in each of the first sampling area and the second sampling area, to accumulate brightness values of pixels located on each of the sampled horizontal lines of the first sampling area to generate first accumulated brightness values for the first image frame, to accumulate brightness values of pixels located on each of the sampled horizontal lines of the second sampling area to generate second accumulated brightness values for the second image frame, and to detect the flicker based on differences between the first accumulated brightness values and the second accumulated brightness values,
wherein the first sampling area and the second sampling area have same sizes and same horizontal starting points within the first and second image frames, and
wherein the first sampling area and the second sampling area have different vertical starting points within the first and second image frames.

2. The apparatus of claim 1, wherein the second image frame is consecutive to the first image frame.

3. The apparatus of claim 2, wherein the controller is further configured to sample the plurality of horizontal lines in the first sampling area, and to sample the plurality of horizontal lines in the second sampling area that exist on same positions as the sampled plurality of horizontal lines in the first sampling area.

4. The apparatus of claim 2, further comprising a memory configured to store a plurality of light-source frequencies and a plurality of flicker counts that correspond to the plurality of light-source frequencies,
wherein the controller is further configured to determine values of the differences between the first accumulated brightness values and the second accumulated brightness values, to perform Fast Fourier Transformation (FFT) on the values of the differences to produce FFT results, to determine whether a maximum FFT result of the FFT results corresponds to any of the flicker counts, and, when the maximum FFT result corresponds to any of the flicker counts, to determine that the flicker has occurred.

5. The apparatus of claim 4, wherein the controller is further configured to identify a flicker count that corresponds to the maximum FFT result, from among the flicker counts, to identify a light-source frequency that corresponds to the flicker count from among the light-source frequencies, and to synchronize integration time to the light-source frequency.

6. The apparatus of claim 4, wherein the controller is further configured to determine that the flicker has not occurred when the maximum FFT result does not correspond to any of the flicker counts.

7. A method for detecting flicker in a camera module, the method comprising:
generating a first image frame and a second image frame;
setting up a first sampling area in the first image frame, the first sampling area being a partial area of the entire first image frame;
setting up a second sampling area in the second image frame, the second sampling area being a partial area of the entire second image frame;
sampling a plurality of horizontal lines from among all horizontal lines contained in each of the first sampling area and the second sampling area;
accumulating brightness values of pixels located on each of the sampled horizontal lines of the first sampling area to generate first accumulated brightness values for the first image frame;
accumulating brightness values of pixels located on each of the sampled horizontal lines of the second sampling area to generate second accumulated brightness values for the second image frame; and
detecting the flicker based on differences between the first accumulated brightness values and the second accumulated brightness values,
wherein the first sampling area and the second sampling area have same sizes and same horizontal starting points within the first and second image frames, and
wherein the first sampling area and the second sampling area have different vertical starting points within the first and second image frames.

8. The method of claim 7, wherein the generating of the first image frame and the second image frame comprises generating the second image frame generated consecutively to the first image frame.

9. The method of claim 8, wherein the sampling of the plurality of horizontal lines comprises:
sampling the plurality of horizontal lines in the first sampling area; and
sampling the plurality of horizontal lines in the second sampling area that exist on same positions as the sampled plurality of horizontal lines in the first sampling area.

10. The method of claim 8, wherein the detecting of the flicker comprises:
determining values of the differences between the first accumulated brightness values and the second accumulated brightness values;
performing Fast Fourier Transformation (FFT) on the values of the differences to produce FFT results;
determining whether a maximum FFT result of the FFT results corresponds to any of pre-stored flicker counts; and
determining that the flicker has occurred when the maximum FFT result corresponds to any of the flicker counts.

11. The method of claim 10, further comprising:
identifying a flicker count that corresponds to the maximum FFT result from among the flicker counts;
identifying a light-source frequency that corresponds to the flicker count from among pre-stored light-source frequencies; and
synchronizing integration time to the light-source frequency.

12. The method of claim 10, further comprising determining that the flicker has not occurred when the maximum FFT result does not correspond to any of the flicker counts.

13. An apparatus configured to detect flicker in a camera module, the apparatus comprising:
a camera unit configured to generate a first image frame and a second image frame; and
a controller configured to set up a first sampling area in the first image frame, the first sampling area being a partial area of the entire first image frame, to set up a second sampling area in the second image frame, the second sampling area being a partial area of the entire second image frame, to sample a plurality of horizontal lines from among all horizontal lines contained in each of the first sampling area and the second sampling area, to accumulate brightness values of pixels located on each of the sampled horizontal lines of the first sampling area to generate first accumulated brightness values for the first image frame, to accumulate brightness values of pixels located on each of the sampled horizontal lines of the second sampling area to generate second accumulated brightness values for the second image frame, and to detect the flicker based on differences between the first accumulated brightness values and the second accumulated brightness values,
wherein the first sampling area and the second sampling area have same sizes and same horizontal starting points within the first and second image frames,
wherein the first sampling area and the second sampling area have different vertical starting points within the first and second image frames,
wherein the apparatus further comprises a memory configured to store a plurality of light-source frequencies and a plurality of flicker counts that correspond to the plurality of light-source frequencies, and
wherein the controller is further configured to determine values of the differences between the first accumulated brightness values and the second accumulated brightness values, to perform Fast Fourier Transformation (FFT) on the values of the differences to produce FFT results, to determine whether a maximum FFT result of the FFT results corresponds to any of the flicker counts, and, when the maximum FFT result corresponds to any of the flicker counts, to determine that the flicker has occurred.

* * * * *